United States Patent
Ou et al.

(10) Patent No.: US 12,429,377 B2
(45) Date of Patent: Sep. 30, 2025

(54) RAPID DETECTION OF ZINC PYRITHIONE BY SERS

(71) Applicant: CITY UNIVERSITY OF HONG KONG, Kowloon (HK)

(72) Inventors: Weihui Ou, Kowloon (HK); Junda Shen, Kowloon (HK); Jing Zhong, Kowloon (HK); Yang Yang Li, Kowloon (HK); Jian Lu, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 179 days.

(21) Appl. No.: 18/149,539

(22) Filed: Jan. 3, 2023

(65) Prior Publication Data
US 2023/0243701 A1  Aug. 3, 2023

Related U.S. Application Data

(60) Provisional application No. 63/304,474, filed on Jan. 28, 2022.

(51) Int. Cl.
*G01J 3/44* (2006.01)
*B82Y 30/00* (2011.01)

(52) U.S. Cl.
CPC .......... *G01J 3/44* (2013.01); *B82Y 30/00* (2013.01)

(58) Field of Classification Search
CPC ................ G01N 21/658; G01J 3/44
See application file for complete search history.

(56) References Cited

U.S. PATENT DOCUMENTS

2008/0081388 A1* 4/2008 Yasseri ............... B82Y 10/00
438/22

OTHER PUBLICATIONS

Li-Miao Chen, "Surface-Enhanced Raman Detection of Melamine on Silver-Nanoparticle-Decorated Silver/Carbon Nanospheres: Effect of Metal Ions", 2011 (Year: 2011).*
Lydia Sandiford, "Optical Characterisation of Zinc Pyrithione", Mar. 18, 2019 (Year: 2019).*
Saide Z. Nergiz, "Biomimetic SERS substrate: peptide recognition elements for highly selective chemical detection in chemically complex media", Apr. 16, 2013 (Year: 2013).*

* cited by examiner

*Primary Examiner* — Maurice C Smith
(74) *Attorney, Agent, or Firm* — Conley Rose, P.C.; Michael W. Piper; Andrew M. Metrailer

(57) ABSTRACT

Disclosed herein is a method of detecting zinc pyrithione (ZPT) in a sample such as water, waste water, shampoos, etc. The method includes steps of, (a) contacting the sample with a substrate having a layer of metal nanostructure deposited thereon thereby coating the layer of metal nanostructure of the substrate with the sample; and (b) subjecting the sample coated substrate to Raman spectroscopy analysis; wherein, the presence of peaks at 575, 829, 1136 and 1545 cm$^{-1}$ in Raman spectrum indicates the presence of ZPT in the sample. According to embodiments of the present disclosure, the method may detect ZPT in a concentration ranging from 0.1 ng/mL to 8 μg/mL.

13 Claims, 4 Drawing Sheets

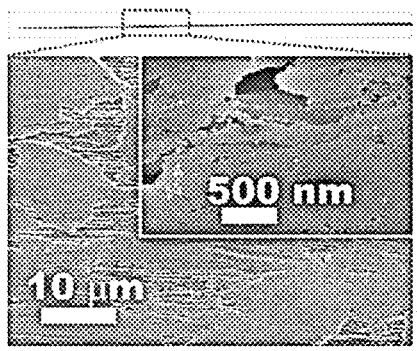 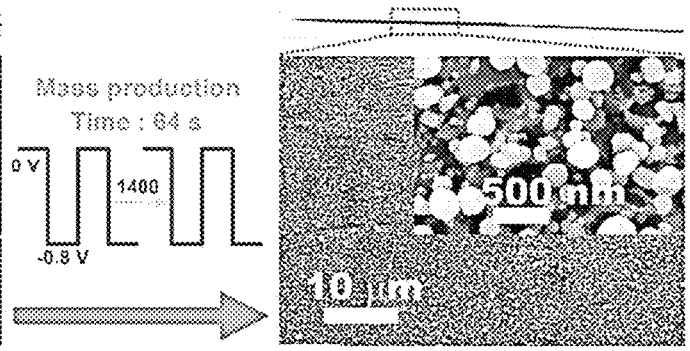
FIG. 1a  FIG. 1b
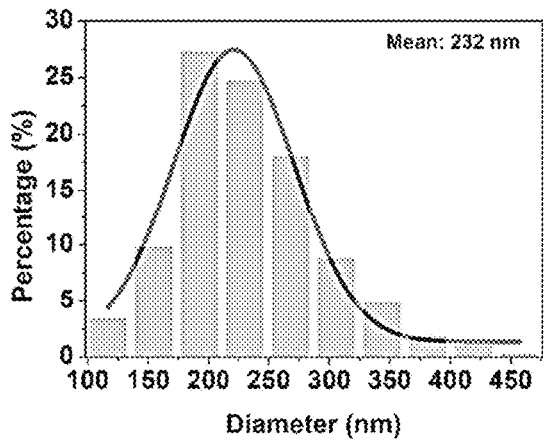 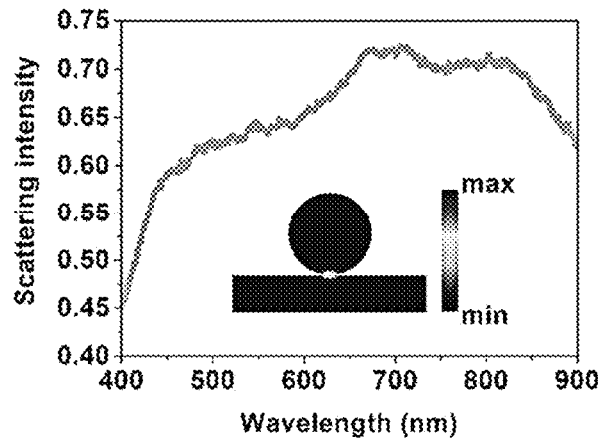
FIG. 1c  FIG. 1d
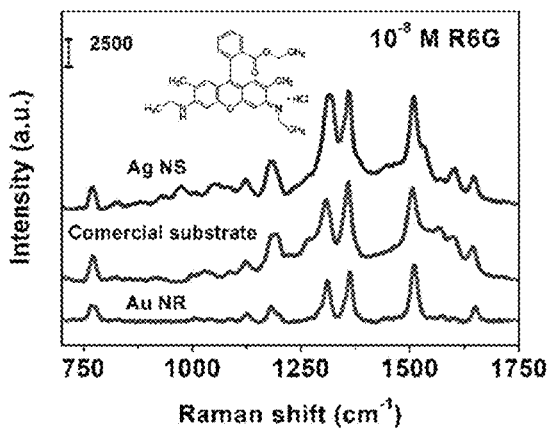 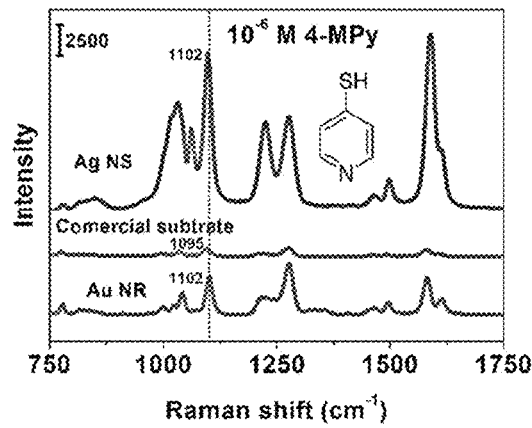
FIG. 1e  FIG. 1f

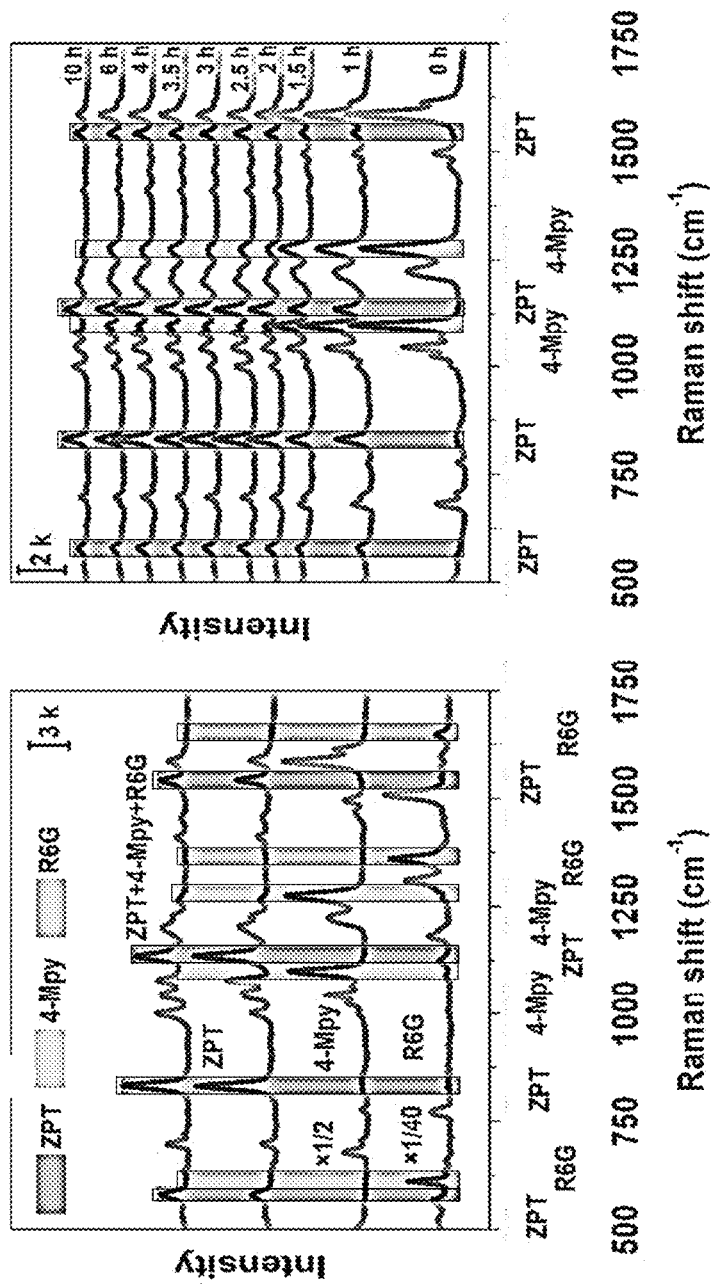

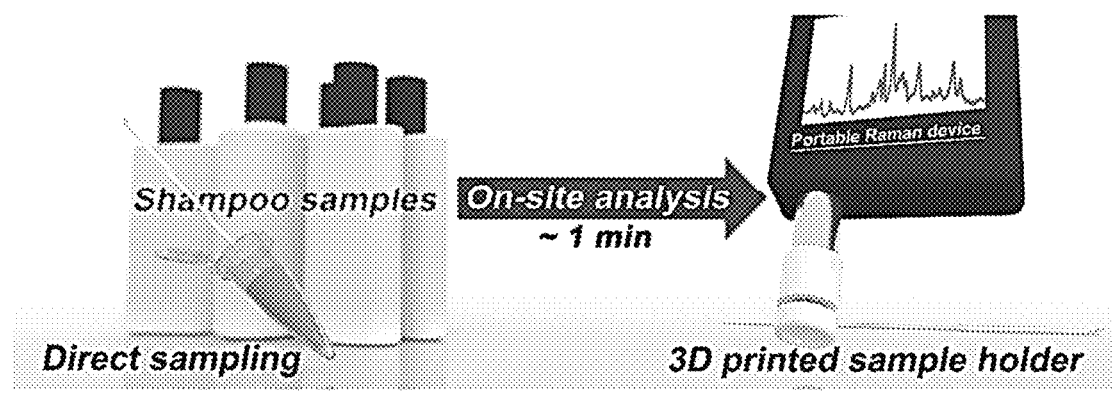
FIG. 4a
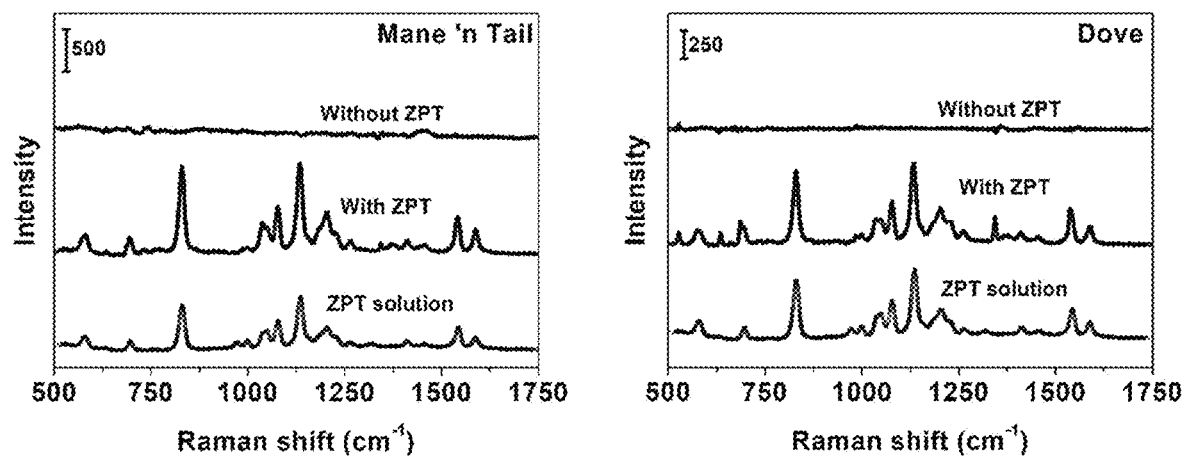
FIG. 4b
FIG. 4c
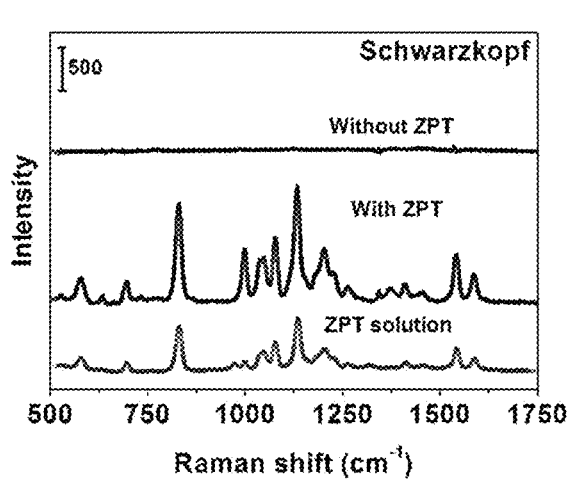
FIG. 4d
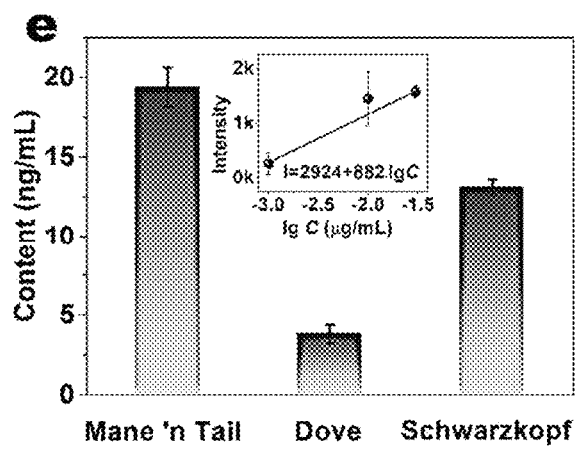
FIG. 4e

RAPID DETECTION OF ZINC PYRITHIONE BY SERS

CROSS-REFERENCE TO RELATED APPLICATIONS

This application claims priority to and the benefit of U.S. Provisional Patent Application No, 63/304,474, filed with the United States Patent and Trademark Office on Jan. 28, 2022 and entitled "RAPID DETECTION OF ZINC PYRITHIONE BY SERS", the entirety of which is incorporated herein by reference for all purposes.

BACKGROUND OF THE INVENTION

1. Field of the Invention

The present invention relates to methods of detecting zinc pyrithione (ZPT); and more particularly, to on-site detecting ZPT by use of surface-enhanced Raman spectroscopy (SERS).

2. Description of Related Art

Zinc pyrithione (ZPT) has been the most used anti-dandruff agents since 1961, with currently recommended maximum concentration of 2% in rinse-off hair products. It has also been broadly used in fields including underwater plumbing and antifouling paints for boats and ships due to its bactericidal and fungicidal activity. Meanwhile, the potential risks of ZnPT in humans and ecosystem has become a growing concern.

It has been demonstrated that zinc species can penetrate human skin after topical application of ZPT, disrupting the skin cells zinc homeostasis. ZPT exposure may also induce immobilization of human spermatozoa, suppress the response of the cAMP/PKA signaling pathway (Yang et al., Eur J. Pharm Sci 2019, 137, 104984), increase oxidative stress (Mo et al., Ecotoxicol Environ Saf 2018, 161, 515-525), and cause DNA damage and PARP-dependent energy crisis in human skin cells (Lamore et al., Cell Stress Chaperones 2010, 15(3), 309-322). Besides, ZPT was found persistent in water bodies and sediments after discharged into aquatic environment. The ecological toxic studies revealed that ZPT led to teratogenic action on the larvae of fish (Bones et al., J Chromatogr A 2006, 1132(1-2), 157-164), fecundity reduction in the marine polychaetes (Marcheselli et al., Aquat Toxicol 2010, 98(2), 204-210), developmental abnormalities in zebrafish and medaka (Goka, K. Environmental Research 1999, 81(1), 81-83), and embryotoxicity in the purple sea urchin and the blue mussel (Bellas et al., Mar Pollut Bull 2005, 50(11), 1382-1385). In early 2021, European Commission has published a draft Regulation to prohibit ZPT from use in cosmetic products, which is expected to apply from 1 Mar. 2022. Under such circumstances, it is an urgent need for achieving rapid, reliable, low-cost, and on-site detection of ZPT in complex samples, e.g., shampoo, organism, and sediment.

Thus far, the reported analytical methods to determine ZPT were mainly based on high-performance liquid chromatography-tandem mass spectroscopy, which is costly and time-consuming. Even worser, this strategy has been shadowed by the readily trans-chelation of ZPT with metallic impurities present in the silica stationary phase (Nakajima et al., J Chromatogr A 1990, 502, 379-384). Other techniques for detecting ZPT, including electrochemical sensing (Shih et al., Talanta 2004, 62(5), 912-917), UV/Vis spectroscopy (Park et al., BioCjip J 2020, 14(2), 211-217), complexometric and potentiometric titration (Egurrola et al., J Analytical Methods in Chemistry 2021, 2021, 6661744), etc., were susceptible to the interference for other substances. Besides, all these developed methods entail cumbersome instrument and tedious pretreatment processes in lab, e.g., derivation reaction, extraction, filter, and pre-concentration.

Surface-enhanced Raman spectroscopy (SERS) is a powerful analytic tool by integrating the fingerprint information of molecular Raman scattering process with intense electric field around the surface of plasmonic metal nanostructures. Here, we developed a rapid, sensitive, and on-site SERS method for the selective determination of ZPT in real complex samples.

SUMMARY

Embodiments of the present disclosure relate to methods of detecting zinc pyrithione (ZPT) in samples, such as specimens derived from aquatic environment (e.g., water, waste water, etc.), personal care products (e.g., shampoos) and the like. The method includes steps of:

(a) contacting the sample with a substrate having a layer of metal nanostructure deposited thereon thereby coating the layer of metal nanostructure of the substrate with the sample; and (b) subjecting the sample coated substrate of step (a) to Raman spectroscopy analysis; wherein, the presence of characteristic peaks of ZPT in the Raman spectrum indicates that the sample contains ZPT.

According to preferred embodiments of the present disclosure, the characteristic peaks of ZPT in Raman spectrum include peaks at 575, 829, 1136 and 1545 $cm^{-1}$.

According to embodiments of the present disclosure, the substrate is produced by electrochemically depositing metal ions on its surface thereby forming the layer of metal nanostructure, in which the metal ions are derived from a bulk, a salt or a colloid of a metal selected from the group consisting of aluminum (Al), copper (Cu), gold (Au), and silver (Ag).

According to some embodiments of the present disclosure, the metal nanostructure is Ag nanosphere, Ag nanocube, Ag octahederon, Ag tetrahedron, Ag truncated octahederon, Ag truncated tetrahedron, Ag nanorod, Ag nanoprism, or Ag nanowire. Preferably, the substrate has the layer of Ag nanosphere deposited thereon.

According to other embodiments of the present disclosure, the metal nanostructure is Au nanosphere, Au nanocube, Au octahederon, Au tetrahedron, Au truncated octahederon, Au truncated tetrahedron, Au nanorod, Au nanoprism, or Au nanowire.

According to further embodiments of the present disclosure, the metal nanostructure is Al nanosphere, Al nanocube, Al octahederon, Al tetrahedron, Al truncated octahederon, Al truncated tetrahedron, Al nanorod, Al nanoprism, or Al nanowire.

According to alternative embodiments of the present disclosure, the metal nanostructure is Cu nanosphere, Cu nanocube, Cu octahederon, Cu tetrahedron, Cu truncated octahederon, Cu truncated tetrahedron, Cu nanorod, Cu nanoprism, or Cu nanowire.

According to preferred embodiments of the present disclosure, in step (a), the substrate is inserted or immersed into the sample, or the sample is sprayed onto the substrate.

According to preferred embodiments of the present disclosure, the sample is a specimen derived from water, sea water, waste water, tap water, a plant, an organic solvent, or a real-life product. Examples of the organic solvent include, but are not limited to, ethanol, dichloromethane, acetonitrile, and the like. Examples of the real-life product include, but are not limited to, body lotions, shampoos, and the like. In one example, the sample is a specimen taken from a shampoo.

According to preferred embodiments of the present disclosure, the peak intensity of 1,136 cm$^{-1}$ in Raman spectrum is linearly related to the logarithmic concentration of ZPT.

According to preferred embodiments of the present disclosure, the present method is capable of detecting ZPT at a concentration ranging from 0.1 ng/mL to 8 μg/mL.

Other and further embodiments of the present disclosure are described in more detail below.

BRIEF DESCRIPTION OF THE DRAWINGS

The disclosure will become more fully understood from the detailed description and the drawings given herein below for illustration only, and thus does not limit the disclosure, wherein:

FIGS. 1(a)-1(f) are SEM images of 1(a) pristine Ag needle and 1(b) Ag NS SERS substrate fabricated by the electrochemical treatment method shown in the middle. 1(c) Size distribution of Ag nanospheres at surface of the Ag NS substrate. 1(d) The scattering spectrum of the Ag NS substrate, with the dominant plasmonic mode shown in the inset. 1(e) and 1(f) Raman spectra of Ag NS, AuNR, and commercial substrates after they were soaked in $10^{-8}$ M R6G and $10^{-6}$ M 4-Mpy solutions for 10 min;

FIGS. 3(a)-3(b) are 3(a) Raman signals collected from Ag NS substrate after soaked in 0.1 μg/mL R6G, 4-Mpy, ZPT, and their mixture solution overnight. 3(b) The temporal evolution of Raman spectra collected from Ag NS substrate that was initially absorbed by 4-Mpy (0 h), and then placed in 0.1 0.1 μg/mL ZPT solution; and FIGS. 4(a)-(e) are 4(a) Schematic illustration of on-site analysis of ZPT in shampoos by the present SERS method. 4(b)-4(d) The SERS spectra collected from shampoos (three different brands) with and without addition of ZPT. 4(e) The estimated concentration of ZPT in the three anti-dandruff shampoos.

DETAILED DESCRIPTION

Figure 2A:
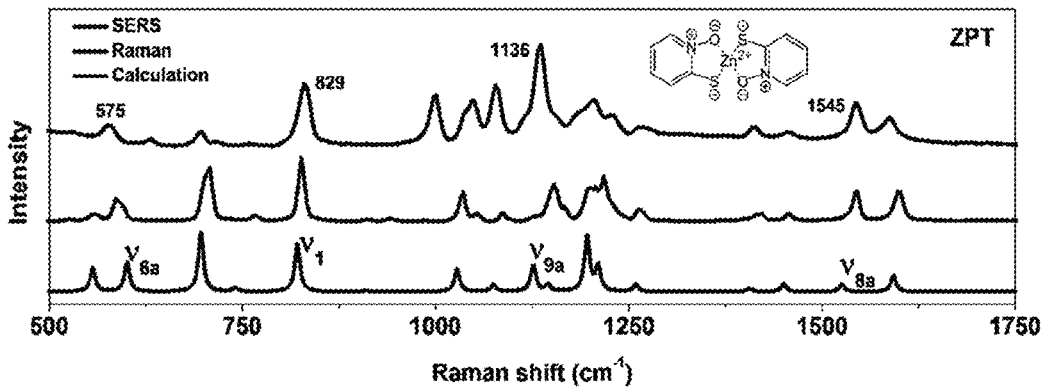
FIG. 2(a)-2(e) are 2(a) Experimentally measured Raman spectra of ZPT on the Ag NS substrate (SERS) and ZPT powder (Raman), and theoretically simulated Raman spectrum of free gas-phase ZPT (Calculation). 2(b) Four prominent vibrational modes contributing to the simulated Raman spectrum, with the colored spheres and green arrow denoting atoms and vibrational vector, respectively. 2(c) Raman spectra of Ag NS substrate immersed in ZPT solution of various concentration for 10 min. 2(d) The comparison of the legally approved maximum amount of ZPT with the detection limit of the present method. 2(e) Temporal evolution of the intensity at 1136 and 829 cm$^{-1}$ of Raman signals in-situ collected from Ag NS substrate immersed in 8 mg/mL ZPT solution.

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Embodiments of the present disclosure include novel methods for on-site detecting ZPT in a real sample without the need of pre-treating the sample (e.g., extraction, filtration, centrifugation, concentration, and etc). Methods in accordance with embodiments of the present disclosure are advantageously simple, easy-to-use, and could specifically and selectively detect ZPT at a concentration as low as 0.003 ng/mL.

The present method commences from the preparation of a substrate suitable for detecting ZPT via Surface-enhanced Raman spectroscopy (SERS). To this purpose, a substrate, preferably a metal substrate, is first electrochemically deposited with a layer of metal ions, thus forming a metal nanostructure on the substrate. The substrate may be made of metal, glass, ceramic, silica, etc. Preferably, the substrate is made of a metal same as the metal ions intended to be deposited thereon. In one preferred example, the substrate is an acupuncture needle made of silver (Ag).

According to embodiments of the present disclosure, the metal ions intended to be deposited on the substrate may be derived from a bulk, a salt or a colloid of a metal, which may be selected from the group consisting of aluminum (Al), copper (Cu), gold (Au), and silver (Ag). According to some embodiments of the present disclosure, the substrate is electrochemically deposited with Ag ions thereby forming a layer of Ag nanostructure, which may be Ag nanosphere, Ag nanocube, Ag octahederon, Ag tetrahedron, Ag truncated octahederon, Ag truncated tetrahedron, Ag nanorod, Ag nanoprism, or Ag nanowire. Preferably, the substrate is electrochemically deposited with the layer of Ag nanosphere thereon. According to other embodiments of the present disclosure, the substrate is electrochemically deposited with Au ions thereby forming a layer of Au nanostructure, which may be Au nanosphere, Au nanocube, Au octahederon, Au tetrahedron, Au truncated octahederon, Au truncated tetrahedron, Au nanorod, Au nanoprism, or Au nanowire. According to further embodiments of the present disclosure, the substrate is electrochemically deposited with Al ions thereby forming a layer of Al nanostructure, which may be Al nanosphere, Al nanocube, Al octahederon, Al tetrahedron, Al truncated octahederon, Al truncated tetrahedron, Al nanorod, Al nanoprism, or Al nanowire. According to alternative embodiments of the present disclosure, the substrate is electrochemically deposited with Cu ions thereby forming a layer of Cu nanostructure, which may be Cu nanosphere, Cu nanocube, Cu octahederon, Cu tetrahedron, Cu truncated octahederon, Cu truncated tetrahedron, Cu nanorod, Cu nanoprism, or Cu nanowire.

To detect ZPT, the substrate described above is inserted or immersed into a ZPT containing sample, preferably, an aquatic sample, so as to evenly coated the layer of metal nanostructure on the substrate with the sample. Alternatively, the ZPT containing sample is sprayed onto the substrate. According to embodiments of the present disclosure, the sample may be a specimen derived from water, sea water, waste water, tap water, a plant, or a real-life product. Examples of the organic solvent include, but are not limited to, ethanol, dichloromethane, acetonitrile, and the like. Examples of the real-life product include, but are not limited to, body lotions, shampoos, and the like. In one preferred embodiment, the sample is a specimen taken from a shampoo.

Then, the sample coated substrate described above is placed onto a sample holder and subjected to Raman spectroscopy analysis, so as to produce a Raman spectrum of the sample. According to embodiments of the present disclosure, peaks at 575, 829, 1136 and 1545 cm$^{-1}$ are characteristic peaks of ZPT correspond to ring deformation, ring breathing, C—H deformation and ring stretching, respectively. Accordingly, the presence of peaks at 575, 829, 1136 and 1545 cm$^{-1}$ in Raman spectrum indicates the presence of ZPT in the sample.

According to further embodiments of the present disclosure, the peak intensity at 1136 cm$^{-1}$ is linearly related to logarithmic concentration of ZPT solution in the range of 8 to 0.03 µg/mL. Accordingly, the amount of ZPT in the sample may be quantified by interpolating the peak intensity at 1,136 cm$^{-1}$ to a standard curve created in accordance with the peak intensity and logarithmic concentration of ZPT relationship described above. According to further embodiments of the present disclosure, the characteristic Raman peaks of ZPT still can be identified even when the concentration of ZPT is as low as 0.003 ng/mL.

The present invention will now be described more specifically with reference to the following embodiments, which are provided for the purpose of demonstration rather than limitation. While they are typically of those that might be used, other procedures, methodologies, or techniques known to those skilled in the art may alternatively be used.

EXAMPLES

Materials and Methods

Fabrication of Ag Nanospheres on the Surface of Ag Acupuncture Needle

Ag acupuncture needle was washed by sequential ultrasonication in acetone, ethanol, and water for 15 mins, respectively. After dried in nitrogen, it was used as the working electrode with the platinum sheet (2 cm×4 cm) and the silver/silver sulfate electrode (Ag/Ag$_2$SO$_4$, 0.70 V vs. SHE at 22° C.) respectively as the counter, and reference electrodes, in a typical three electrode cell. The aqueous solution of 0.1 M HNO$_3$ was utilized as electrolyte. A voltage square-wave program was applied through an electrochemical workstation (Autolab PGSTAT320N, The Netherlands), which consists of 1400 cycles with each cycle modulating between at 0 V and −0.8 V (vs Ag/Ag$_2$SO$_4$) each for 20 ms. Thus-obtained Ag needle featured a surface film of Ag nanospheres (hereinafter referred to as Ag NS), and was used as SERS substrate.

SERS Detection of Standards.

The stock solution of 8 µg/mL zinc pyrithione (ZPT) was prepared by ultrasonicating 4 mg ZPT powder in 500 mL of water for 30 min. The stock solution of 1 mM 4-mercaptopyridine (4-Mpy) was prepared by dissolving 5.6 mg in 50 mL of absolute ethanol under ultrasonication. The stock solution of 1 mM R6G was obtained through ultrasonication-assisted dissolution of 24 mg in 50 mL of water. Other solutions with lower concentration of ZPT, 4-Mpy, and rhodamine 6G (R6G) were obtained by directly diluting these stock solutions with water. After immersed in the specified solutions for 10 min, the Ag NS substrate was taken out, and directly spectrally readout by a portable Raman spectrometer coupled with our home-made 3D printed holder for automated optical focusing. For the study on the dynamics of the interaction between ZPT and Ag, the Ag NS substrate was soaked in a ZPT solution in a quartz cuvette with its temporal evolution of Raman spectra automatedly sequentially acquired at 30 s interval after manual focusing.

The SERS Analysis of Real Samples.

The shampoos from three different brands, i.e., Mane'n Tail, Dove, and Schwarzkopf, were purchased from a local supermarket in Hong Kong. The shampoos of each brand include two products with and without ZPT, respectively.

The Ag NS substrate was inserted into the lotions of shampoos for 1 min, and taken out for spectral collection in the home-made 3D printed holder by a portable Raman spectrometer. To investigate the applicability of our SERS method in the analysis of ZPT in environmental samples, an artificial aquatic micro-ecosystem was built, in which three kinds of hydrophytes (20 g *Salvinia cucullate*, 20 g *Elodea canadensis*, and 20 g *Ceratophyllum demersum*) and two kinds of soils (20 g for each) were placed in 1,000 mL of tap water containing ZPT. The hydrophytes were bought from a local market in Hong Kong. The soils were excavated from the campus of City University of Hong Kong (CityU) and Shek Kip Mei, respectively. After 48 h, the hydrophytes and soils were taken out, and washed by centrifuge. The hydrophytes were smashed by a corn juicer machine, with its SERS signals collected by the portable Raman spectrometer after the immersion of the Ag NS substrate for 10 min. The SERS signals of soils were obtained after the directly insertion of Ag NS substrate for 10 min.

Material Characterization

The size and morphology of thus-obtained Ag nanoparticles on the surface were examined by a field-emission scanning electron microscope (SEM, FEI Quanta 200F). X-ray diffraction patterns (XRD) were measured on an X-ray diffractometer (Rigaku) with Cu-Kα radiation (1=1.5405 Å) by setting increment step as 0.02 θ. X-ray photoelectron spectroscopy (XPS) was carried out on a VG Kα Probe spectrometer (Thermo Fisher Scientific) with Al Kα radiation as the excitation source. The energy resolution of 0.8 eV and 0.1 eV were set for overall and core-level spectra, respectively. All peak positions were corrected by referencing the C1s peak position of to 284.8 eV.

ICP-AES measurement. Two portions of 5 mL of 0.5 µg/mL ZPT aqueous solution were prepared by diluting ZPT stock solution. Thirty Ag NS substrates were immersed in the one portion of ZPT aqueous solution overnight. Then, the concentration of Zn and Ag in two solutions were analyzed by inductively coupled plasma atomic emission spectroscopy (ICP-AES, PE optima 6000).

Theoretical Calculations.

All calculations were performed using the Gaussian 09 package (Gaussian Inc., Wallingford Ct, 2009). Both the geometry optimization and the Raman activity evaluation were conducted using B3LYP hybrid density functional. We use 6-311++G(3df,3pd) basic set for C, H, O, N, S and def2-TZVPD basic set for Zn. Since the harmonic approximation usually overestimates vibrational frequencies, the calculated frequencies were corrected by a fundamental scale factor of 0.9876 pre-evaluated for B3LYP/6-311++G (3df,3pd) level (Merrick et al., *The Journal of Physical Chemistry A* 2007, 111(45), 11683-11700). The Raman intensities ($I_i$) were calculated by the following equation at T=298.15 K, $$I_i = \frac{C(V_0 - V_i)^4 S_i}{v_i B_i}; B_i = 1 - \exp\left(-\frac{hvc_i}{k_B T}\right)$$

where i refers to vibrational mode, C is a normalization factor that can be arbitrarily chosen, h, c, and $k_B$ are the Planck constant, light speed, and the Boltzmann constant, respectively. S is the calculated Raman activity, v is vibrational frequency, $v_0$ corresponds to the frequency of incident light. In this work, the value of $v_0$ is set to be 785 nm.

Example 1 Detecting ZPT by Use of SERS Substrate

1.1 Fabrication and Characterization of SERS Substrate

In this example, the SERS substrate for detecting ZPT was fabricated in accordance with methods described in the "Material and Methods" section, in which a commercial Ag acupuncture needle was electrochemically deposited with a film of Ag nanospheres. The scanning electron microscope (SEM) photographs of Ag needle before and after electrochemical treatment are shown in FIG. 1, panels (a) and (b), respectively. The thus-obtained substrate featured a surface of Ag nanospheres (Ag NS) (~232 nm) (FIG. 1, (c)), which supported a broadband optical scattering from 400 to 900 nm (FIG. 1, (d)) originated mainly from the contribution of plasmonic gap mode (the inset of FIG. 1, (d)) of Ag nanospheres over the substrate. More importantly, the electric field in proximity of the gap was remarkably amplified (hot spot), leading to a substantial enhancement of Raman signal of molecules in this region.

The SERS performance of Ag NS substrate was also evaluated by detecting two widely-used Raman probe molecules: rhodamine 6G (R6G) and 4-mercaptopyridine (4-Mpy). The characteristic peaks of R6G Raman scattering were clearly observed on Ag NS substrate, with the intensity comparable to that of R6G at commercial and AuNR-based SERS substrates (FIG. 1, (e)), which exhibited excellent enhancement factor. As to 4-Mpy, its Raman signals were stronger at Ag NS than AuNR-based substrates, even much stronger (e.g., by 14 times at 1580 $cm^{-1}$) than the commercial substrates (FIG. 1, (f)). Note that the commercial substrate was comprised of Ag@$SiO_2$ core@shell nanoparticles, exhibiting the trigonal ring breathing with a C=S mode of 4-Mpy at 1095 $cm^{-1}$ (dotted line). When Ag NS and AuNR-based substrates were used, this peak shifted to 1102 $cm^{-1}$ due to the effects of the altered C—S bond on the ring vibrations after the formation of an Ag/Au—S bond. This strong Ag/Au—S bond facilitated 4-Mpy in bulk solution to reach the substrate, thus enabling the Raman signals of more 4-Mpy molecules amplified. It should be emphasized that the chemical affinity of Ag toward S was actually weaker than Au. However, Ag NS substrate showed superior performance to Au NR-based substrate, possibly due to the robust structure of Ag NS substrate reserved its hot spots (gap) during sampling process while the structure of AuNR-based substrate was prone to change and lost some hot spots in ethanoic solution.

Taken together, the excellent enhancement factor, structure robustness, and strong chemical bonding with thiol group enabled Ag NS to serve as an idea SERS substrate for the determination of ZPT.

1.2 Detecting ZPT with the SERS Substrate of Example 1.1

Figure 2B:
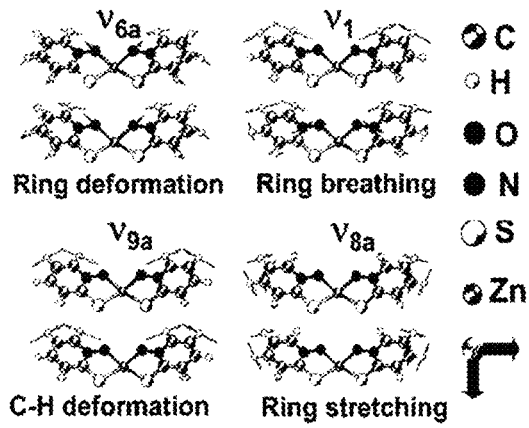
Figure 2C:
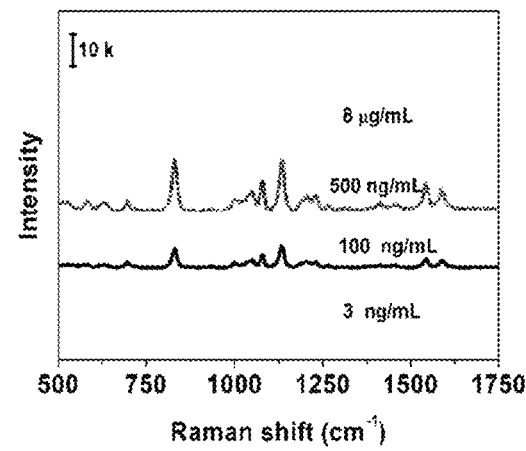
Figure 2D:
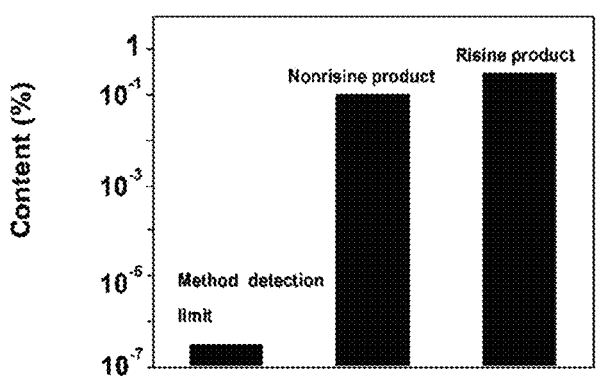
Figure 2E:
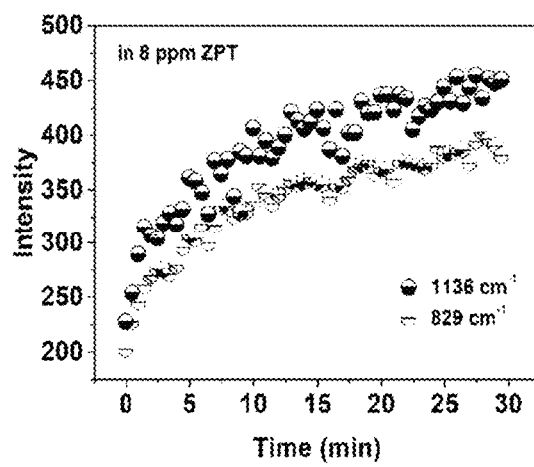

In this example, the ability of the SERS substrate of example 1.1 in detecting ZPT was investigated. To this purpose, the SERS substrate of example 1.1 was immersed in ZPT solution (8 µg/mL) for 10 minutes, then was taken out and spectrally collected by using a portable Raman spectrometer coupled with a homemade 3D printed holder for optical focusing. Results are provided in FIG. 2.

The Raman spectra showed the strongest peak at 1136 $cm^{-1}$, and well-defined peaks at 575, 697, 829, 1001, 1078, 1413, 1545, 1589 $cm^{-1}$, and other peaks with weaker intensity or shoulders (FIG. 2, (a)). Their Raman shifts were overall consistent with those of ZPT power, validating that the SERS signals were sourced from the amplified Raman scattering processes of ZPT at Ag NS substrate. It is well known that the same molecule may display quite different relative intensity in its Raman and SERS spectra due to charge transfer between molecule and substrate (Wang et al., The Journal of Physical Chemistry C 2014, 118(19), 10191-10197), molecular structure orientation (Rodriguez et al., ACS Photonics 2021), plasmon-shaping effect (Itoh et al., Physical Review B 2007, 76(8), 085405), etc. This was in line with our observations, e.g., the strongest Raman peak of ZPT power was centered at 826 $cm^{-1}$, rather than 1136 $cm^{-1}$ for SERS of ZPT at Ag NS substrate.

To provide physically fundamental insight into the observed Raman spectra of ZPT, the Raman activity of free gas-phase ZPT was calculated by using density functional theory (DFT). Although the calculated Raman vibration frequencies generally deviate, to some extent, from the experimental one, the calculated Raman active modes in gas-phase enabled us to preliminarily assign the Raman peak to a specific vibrational mode. The ZPT molecule features 69 vibrational normal modes (3N-6), of which 35 normal modes are Raman active (>1 $Å^4$/amu, data not shown). The Raman vibration frequencies calculated for gas-phase ZPT molecule were highly consistent with the Raman shifts collected from ZPT power. The peaks at 575, 829, 1136, 1545 $cm^{-1}$ were identified as the ring deformation ($v_{6a}$), ring breathing ($v_1$), C—H deformation ($v_{9a}$), ring stretching ($v_{8a}$), respectively (FIG. 2, (b)). These four peaks persistently present in both the Raman spectrum of ZPT power and the SERS of ZPT at Ag NS substrate, and therefore were selected as the characteristic peaks of ZPT. Note that each vibration mode possesses two degenerate frequencies because the vibrations of two benzene rings in ZPT molecule are independent from each other.

The intensity of ZPT SERS sharply decreased when its concentration reduced from 8 to 0.03 µg/mL, but slowly stepped down with further reduction (FIG. 2, (c)). It is worth emphasized that the peak intensity of 1136 was linearly related to the logarithmic concentration of ZPT solution ranging from 8 to 0.03 µg/mL. The characteristic Raman peaks of ZPT could still be identified even when the concentration was lowered to 0.003 ng/mL (FIG. 2, (c)), which served as the detection limit of this method. This value is almost six orders of magnitude lower than the maximum amount of ZPT that were approved by FDA in the rinse and non-rinse products (FIG. 2, (d)). Moreover, the peak intensity of both 829 and 1136 $cm^{-1}$ rocketed to the 80% of maximum around 10 min, signifying the fast reaction kinetics between ZPT and Ag NS substrate (FIG. 2, (e)).

Taken together, the results demonstrated that the present method of detecting ZPT by SERS with the aid of Ag NS substrate is highly sensitive and efficient.

1.4 Selectivity of the SERS Substrate of Example 1.1 in the Detection of ZPT The selectivity of SERS detection of targeted molecule has long been plagued by the competitive occupation of hot spots by other species. This greatly undermines the practicality of SERS technique in analyzing the real sample with complex matrix. Surprisingly, the SERS detection of ZPT with the aid of Ag NS substrate of Example 1.1 was almost unaffected by other co-existed Raman active molecules. When the Ag NS substrate was soaked overnight in the mixture solution of ZPT, R6G, and 4-Mpy, only the characteristic spectrum of ZPT was observed in its SERS signals (FIG. 3, (a)), signifying that the hot spots of Ag NS substrate were preferentially occupied by ZPT.

Alternatively, the Ag NS substrate was first soaked in 4-Mpy solution for 30 min, and subsequently immersed in ZPT solution and taken out for spectral collection at consecutive time intervals. The SERS signals, at first, could be solely assigned to 4-Mpy, then included the spectra of both 4-Mpy and ZPT, and finally completely determined by ZPT (FIG. 3, (b)).

Example 2 Detecting ZPT in Shampoos by Use of the SERS Substrate of Example 1.1

In this example, the SERS substrate of Example 1.1 was used to detect ZPT in commercially available hair products (e.g., shampoos) in Hong Kong market. Specifically, the on-site SERS analysis of ZPT consisted of direct sampling from real products and spectral read-out by a portable Raman spectrometer and a home-made 3D print holder (FIG. 4, (a)), in which the entire process took less than 1 min and without having the need of pretreating the sample.

The spectra collected from three brands (Mane'n Tail, Dove, and Schwarzkopf) of shampoos with ZPT were consistent with that collected from ZPT solution (FIG. 4, (b), (c), and (d)). By contrast, the spectra of these brands of shampoos without ZPT exhibited weak signals submerged in background. Based on the fitting equation of the peak intensity of 1139 $cm^{-1}$ vs the logarithmic concentration (1-30 ng/mL) of ZPT solution, the amounts of ZPT were estimated to be 19.4, 3.8 and 13.1 ng/mL in Mane'n Tail, Dove, and Schwarzkopf shampoos, respectively (FIG. 4, (e)). The estimated values were lower than the ones in their ingredient manuals (data dot shown), which may be caused by the different partition behavior of ZPT in aqueous solution/Ag and shampoo lotion/Ag systems (e.g., the ZPT suffers from large resistance to diffusion in sticky shampoo and is thus difficult to reach the Ag NS substrate for contributing Raman signals).

Taken together, the data in working examples confirmed that the SERS substrate of the present disclosure (i.e., the Ag NS substrate) could be mass-produced in relatively low cost, and the method developed herein could selectively detect ZPT ranging from 0.003 ng/mL to 8 µg/mL.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of the present disclosure.

What is claimed is:

1. A method of detecting zinc pyrithione (ZPT) in a sample, comprising:
   (a) contacting the sample with a substrate having a layer of metal nanostructure deposited thereon thereby coating the layer of metal nanostructure of the substrate with the sample; and
   (b) subjecting the sample coated substrate of step (a) to Raman spectroscopy analysis;
   wherein,
      the presence of characteristic peaks of ZPT in the Raman spectrum indicates that the sample contains ZPT; and
      the characteristic peaks of ZPT in the Raman spectrum include peaks at 575, 829, 1136, and 1545 cm−1.

2. The method of claim 1, wherein the substrate is produced by electrochemically depositing metal ions on its surface thereby forming the layer of metal nanostructure, in which the metal ions are derived from a bulk, a salt, or colloid of a metal selected from the group consisting of aluminum (Al), copper (Cu), gold (Au), and silver (Ag).

3. The method of claim 1, wherein the metal nanostructure is Ag nanosphere, Ag nanocube, Ag octahederon, Ag tetrahedron, Ag truncated octahederon, Ag truncated tetrahedron, Ag nanorod, Ag nanoprism, or Ag nanowire.

4. The method of claim 2, wherein the substrate has the layer of Ag nanosphere deposited thereon.

5. The method of claim 1, wherein the metal nanostructure is Au nanosphere, Au nanocube, Au octahederon, Au tetrahedron, Au truncated octahederon, Au truncated tetrahedron, Au nanorod, Au nanoprism, or Au nanowire.

6. The method of claim 1, wherein the metal nanostructure is Al nanosphere, Al nanocube, Al octahederon, Al tetrahedron, Al truncated octahederon, Al truncated tetrahedron, Al nanorod, Al nanoprism, or Al nanowire.

7. The method of claim 1, wherein the metal nanostructure is Cu nanosphere, Cu nanocube, Cu octahederon, Cu tetrahedron, Cu truncated octahederon, Cu truncated tetrahedron, Cu nanorod, Cu nanoprism, or Cu nanowire.

8. The method of claim 1, wherein in step (a), the substrate is inserted or immersed into the sample, or the sample is sprayed onto the substrate.

9. The method of claim 7, wherein the sample is a specimen derived from water, sea water, waste water, tap water, a plant, an organic solvent, or a real-life product.

10. The method of claim 9, wherein the organic solvent is ethanol, dichloromethane, or acetonitrile.

11. The method of claim 9, wherein the real-life product is a shampoo or a body lotion.

12. The method of claim 1, wherein the peak intensity of 1,136 $cm^{-1}$ in the Raman spectrum is linearly related to the logarithmic concentration of ZPT.

13. The method of claim 12, wherein the method can detect ZPT at a concentration ranging from 0.1 ng/ml to 8 µg/mL.

* * * * *